United States Patent [19]

Ritz

[11] Patent Number: 5,056,455

[45] Date of Patent: Oct. 15, 1991

[54] BREADING MACHINE

[75] Inventor: Paul Ritz, Marblehead, Ohio

[73] Assignee: Stein, Inc., Sandusky, Ohio

[21] Appl. No.: 391,477

[22] Filed: Aug. 9, 1989

[51] Int. Cl.[5] .......................... A23P 1/08; B05C 19/06
[52] U.S. Cl. ........................................ 118/17; 118/24; 118/312; 118/602
[58] Field of Search ........................ 118/13, 16, 17, 18, 118/21, 24, 312, 602

[56] References Cited

U.S. PATENT DOCUMENTS

| | | | |
|---|---|---|---|
| 2,855,893 | 10/1958 | Greer et al. | 118/22 |
| 3,547,075 | 12/1970 | Johnson | 118/16 |
| 3,596,633 | 8/1971 | Porter | 118/16 |
| 3,647,189 | 3/1972 | Johnson | 118/16 |
| 3,759,218 | 9/1973 | Korstvedt | 118/24 |
| 3,885,519 | 5/1975 | Orlowski | 118/22 |
| 4,128,160 | 12/1978 | Deal et al. | 198/657 |
| 4,333,415 | 6/1982 | Miller et al. | 118/24 |
| 4,496,084 | 1/1985 | Booth et al. | 118/24 |
| 4,662,306 | 5/1987 | Miller | 118/24 |

Primary Examiner—James C. Housel
Attorney, Agent, or Firm—Oldham & Oldham Co.

[57] ABSTRACT

A breading machine is provided in which the breading recirculation system enables effective circulation of excess breading through the machine to be reused for dispending the breading material onto the surfaces of a food product. The circulation system distributes a variety of breading materials more efficiently so as to avoid congestion or build up of the breading materials within the machine which has previously required cleaning or other functions to be performed. The circulation system provides direct auger-to-auger coupling at transition zones between various breading transporting screws within the machine. Further, appropriately positioned discharge chutes are provided to enable some types of breading materials to be transferred at the transition zones without damaging the breading materials. The circulation system is also completely contained so as to be safe and effective in its operation and yet is easily cleanable to maintain sanitary conditions.

17 Claims, 9 Drawing Sheets

PRIOR ART

BREADING MACHINE

BACKGROUND OF THE INVENTION

This invention relates to a breading machine for selectively dispensing a breading material onto, food pieces which may be coated with batter and breading before being fried or cooked in some manner. More particularly, the invention comprises a breading machine which more effectively dispenses a breading material onto the food product and distributes a variety of breading materials more efficiently so as to avoid congestion or build up of the breading materials within the machine.

In the field of large scale production of prepared foods, many food items are desired to be coated with batter and breading before being fried in deep fat and subsequently distributed to the consumer. The breading material is conventionally a dry farinaceous material which may consist of a fine particle flour breading, Japanese style bread crumbs which display a wide variation in crumb sizes, or a free-flowing breading usually consisting of cracker meal of reasonably hard and roughly spherical particles ranging in different sizes. Each of the different breading materials has its own peculiarities which may have an effect in their distribution and handling within a breading machine. For example, a flour breading which may be a wheat or other grain flour including seasonings, spices, shortenings and other ingredients usually consists of ground dust-like particles having an tendency to pack or build up so as to create bridging of the breading material over openings within the breading machine inhibiting free flow and proper functioning of the machine. On the other hand, Japanese style crumbs usually consist of a modified wheat flour with small percentages of yeast, salt, sugar, vegetable oil and other additives. The Japanese style crumbs appear to be dried shredded white bread having particle sizes as large as one-half inch or as little as flour size particles with a distribution of sizes therebetween. The Japanese style crumbs attain no uniform shape and are very delicate such that they will not withstand the abuse that standard granular breadings will endure. The Japanese crumbs will also self-bridge over larger openings than that of other common granular breadings.

It should be recognized that the breading machine must either be constructed to handle an individual type of breading material or must contain features to accommodate different breading materials having different physical characteristics. It should also be understood that large scale producers desire a breading machine which can handle large volumes of food pieces while effectively providing a breading coating on both the top and bottom of the food pieces. Thus, the breading machines have become larger and more complex and are adapted to run at higher speeds for longer periods of time to accommodate the user's needs.

One prior art breading machine is shown in U.S. Pat. No. 4,128,160, which forms a bottom layer of breading on a moving product belt on which a battered food product to be breaded may be placed. The moving belt then carries the product under a falling curtain of breading which covers the top and sides of the battered product pieces to form a uniform coating of breading on all surfaces of the product. The product pieces may then be passed on to a series of rollers or the like which will gently press the top layer of the breading onto the product and onto and into the bottom layer on the moving belt. Excess breading may then be removed with vibrators or air curtains and the coated or breaded product is then removed from the breading machine.

Another breading machine as shown in U.S. Pat. No. 4,333,415 is designed more specifically for the application of Japanese style bread crumbs for insuring that the bottom and top product coating layers of breading supply the proper combination of coarse and fine Japanese style bread crumbs to uniformingly coat the bottom and top surfaces of the product pieces.

In both of the breading machines mentioned above, a common problem occurs in that the breading material tends to bridge across the flow openings within the breading machine, thereby stopping flow of the breading material within the breading machine necessitating stopping production and clearing the build up of breading material for proper operation of the machine. This is particularly a problem when the breading machine is run at higher speeds for the breading of a larger volume of food product. It must also be recognized that the handling of the various types of breading materials requires that the breading machine effectively distribute both fine particle flour breadings as well as the Japanese style bread crumbs without adversely affecting the more fragile Japanese style crumbs.

Another prior art breading machine is found in U.S. Pat. No. 4,496,084 which shows a breading machine especially useful to flour breading applications having finely ground dust-like particles which have a tendency to pack under pressure. This breading machine includes a circulation system for the breading material for recirculation of any excess breading material recovered in a breading cycle. The circulation of the breading material includes a hopper suitable for use with flour or free flowing breading which dispenses the breading material onto the food products. A cross feed screw is utilized to carry excess breading material to a vertical screw which then recirculates the breading material to the hopper for subsequent application to the food products. It has been found at the location of the cross feed and vertical screws, the breading material may have the tendency to bridge and cause congestion within the breading machine thereby inhibiting its effective use for high volume production.

SUMMARY OF THE INVENTION

It is therefore a primary object of this invention to provide a breading machine to coat the bottom and top surfaces of product pieces in a large scale production operation while avoiding bridging of the breading material which would inhibit the effective use of the machine.

It is yet another object of the invention to provide a breading machine with a more effective breading material circulation system which is useful with any particular type of breading material.

Another object of the invention is to provide a breading machine in which the breading material circulation system may be selectively operated to accommodate different breading materials and to avoid congestion of the breading material as desired.

It is yet another object of the invention to provide a breading machine having a breading material circulation system which is completely contained so as to be safe and effective in its operation and yet is easily cleanable to maintain the sanitary condition of the machine.

These and other objects of the invention are achieved by a reasonably priced, simple, and sanitary breading machine suitable for coating a variety of food products with different types of breading materials. The circulation of the breading material within the breading machine is particularly important for the effective operation of the machine in large scale production environments.

BRIEF DESCRIPTION OF THE DRAWINGS

Additional objects and advantages of the apparatus of the present invention will become apparent to one skilled in the art upon reference to the following description of a preferred embodiment in the accompanying drawings wherein.

DETAILED DESCRIPTION OF THE INVENTION

Figure 1:
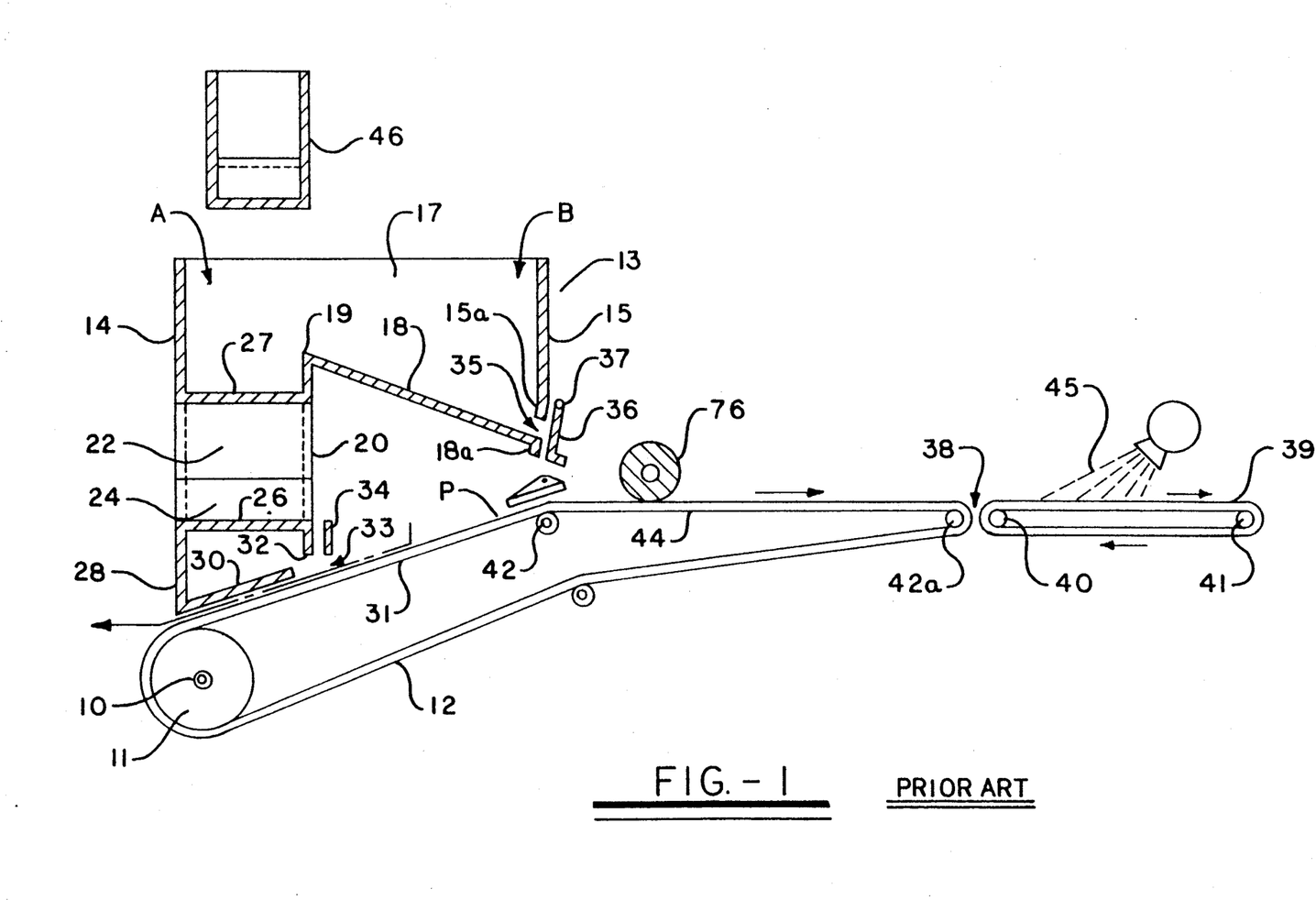
FIG. 1 is a vertical sectional view in schematic form of a typical prior art breading machine having a movable product belt wherein the sectional plane lies on the longitudinal center line of the product belt.

Referring now to FIG. 1, the construction of a typical breading machine of the prior art for granular type breading material is shown. In this breading machine, a frame (not shown) is used to support all of the elements of the machine as seen in FIG. 1 in their proper operating relationship. A drive shaft 10 carries a drive pulley 11 which drives an endless impervious membrane belt 12. The endless belt 12 acts as the main product belt upon which the food products to be coated or breaded are placed for the breading operation. The belt 12 is further supported by at least two idler rollers 42 and 42a which maintain the belt runs in the configuration as shown wherein a portion of the belt run between pulley 11 and the first roller 42 is upwardly inclined at 31 as it passes under the hopper 13 which supplies breading material to the belt 12. An upper belt run 44 extends between idler roller 42 and idler roller 42a in a generally horizontal orientation to provide a product carrying portion along the supporting frame. The product carrying portion or upper belt run 44 is spaced from and below one or more pressure devices such as a roll 76 which is utilized to apply pressure to the upper surface of the food products as they pass thereunder.

The breading material which is to be applied to the food products is disposed in hopper 13 having a rear wall 14, a front wall 15, and side walls 17 along with a sloping bottom wall 18 joined in a ridge 19 with an intermediate wall 20. As can be seen in FIG. 1, the hopper 13 has two volumes indicated as section A and B acting to distribute the breading material evenly in the breading process. The lower edge of rear wall 14 is turned inwardly toward intermediate wall 20 to form a flange 28. Similarly, the lower edges of the hopper side walls 17 in hopper section A are turned inwardly to form flanges 30 wherein the flanges 28 and 30 are in close proximity to, but not touching, the upwardly sloping portion 31 of the upper product belt run. The function of the flanges 28 and 30 is to reduce breading leaks between the belt 12 and the side walls 14 and 17 of the hopper 13. The bottom of the intermediate wall 20 terminates at 32 a short distance above the sloping belt portion 31 forming a slot 33 between the product belt 12. The slot 33 is fitted with a sliding gate schematically shown at 34 which may be moved vertically downward to reduce the height of the slot 33 when desired.

In hopper section B, the front wall 15 is also turned inwardly and downwardly at 15a and toward the sloping bottom wall 18 which is also turned downwardly at 18a to form an opening 35 therebetween for dispensing of the breading material A gate 36 is pivotally attached at 37 to the frame and may be adjusted to vary the dimensions of opening 35 as desired.

The discharge end 38 of the product belt 12 is in close proximity to a wire mesh belt conveyor 39 which is supported by a drive roll 40 and a discharge roll 41 at the same height as the product carrying portion 44 of belt 12. One or more air blowers 45 are mounted over the wire belt conveyer 39 and are operable to blow excess breading off the product top as it passes through the air curtains generated by blowers 45.

In operation, the breading machine as shown in FIG. 1 is supplied with an amount of breading in the hopper 13 wherein a portion of the breading material is disposed in section A while another portion is disposed in section B thereof. Section A of the hopper 13 is divided into two channels by means of a gable-diverter structure comprising sloping roof walls 22 which meet at their upper edge to form a peak or ridge 27 operating to divert the breading material into the two channels of the hopper section A. Two side vertical walls 24 extend from the sloping roof walls 22 of the gable-diverter structure, and a bottom wall 26 extends therebetween the form a passage way (not shown) which extends completely through section A of the hopper 13. A conveyor (not shown) is usually extended through the passage way formed by the gable-diverter from a batter applicator means (not shown) such that a battered product may be deposited upon the lower breading layer on product belt section 31 in the vicinity of the support roller 42 as shown at P. Thus, a battered product will be covered on its bottom layer with breading material disposed on the product belt portion 31 and will be carried by the product belt towards the opening 35 of hopper Section B. At the location of opening 35 of hopper Section B, an amount of breading material will be supplied to the upper surface of the battered product traveling on the product belt 12. The structure of the hopper 13 including the gable-like diverter structure separating Section A of the hopper 13 into channels act to distribute the breading material in a desired fashion to distribute different sized breading particles evenly for application to the food products.

Figure 2:
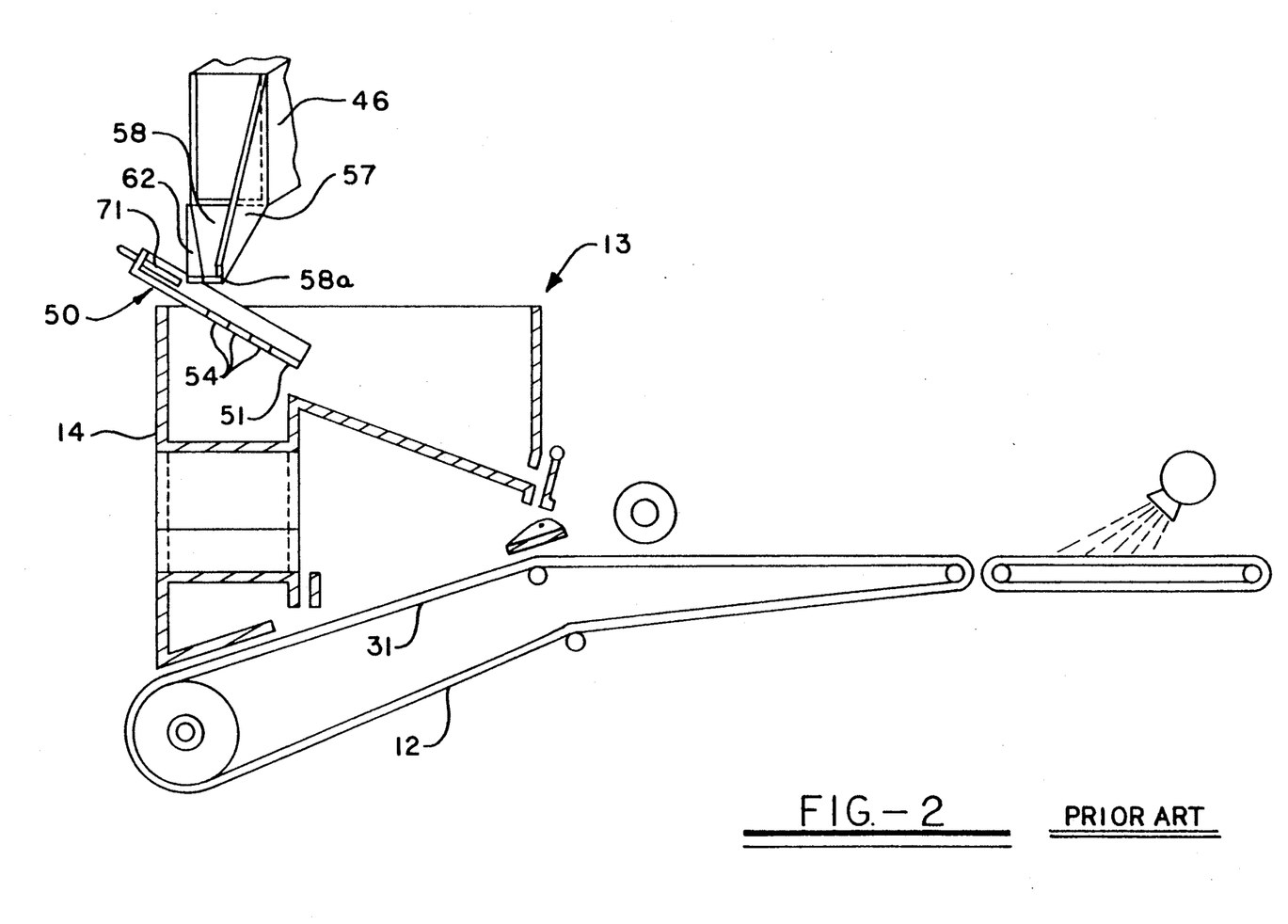
FIG. 2 is a vertical sectional view in schematic form of another prior art breading machine usable with Japanese style bread crumbs similar to that shown in FIG. 1.

A similar structure is shown in FIG. 2 for use with Japanese style bread crumbs so as to provide for optimum coating of the food products In this prior art breading machine, a sifter plate 50 having perforations 54 will accept the Japanese style crumbs from a discharge spout 46 located above and to one side of the hopper 13. Located within the sifter 50 is positioned an imperforate plate 71 which extends over the bottom wall 51 of the plate 50 whereby one or more rows of perforations 54 may be covered by the imperforate plate 71. The sifter plate 50 may be initially adjusted by means not shown so as to be positioned at a preselected angular position with respect to the hopper 13 and secured in this position for the particular type of breading crumbs utilized. The discharge spout 46 is modified for use with Japanese style bread crumbs to include a distributor chute 57 attached thereto such that a side edge 62 of bottom wall 58 is substantially parallel to the plane of rear wall 14 of the hopper 13, and substantially transverse to the direction of movement of the product along the coating path as defined by the conveyor belt 12. The distributor chute 57 may be rotated slightly in a vertical plane such that the wall 58 may be positioned at a preselected downward slope from the discharge spout 46. This assembly allows Japanese style bread crumbs to be initially fed by the distributor spout 46 into the distributor chute 57 and onto the bottom wall 58 thereof. Because the distributor chute 57 angles downwardly toward and across the hopper 13, the crumbs slide along the bottom wall 58 and towards the junction 58a thereof. This structure enables a substantially even distribution of Japanese style crumbs to be formed across the complete width of sifter plate 50 at the location of the imperforate plate 71 and to settle and sift out the finer particles from the mixture as the layer of the breading material crosses the perforations 54 in plate 50. This modified hopper structure as shown in FIG. 2 enables proper coating of food products with Japanese style crumbs which is more fully described in U.S. Pat. No. 4,333,415, and is usable with a similar distribution and conveying structure as shown with reference to FIG. 1 wherein like elements are indicated by like reference numerals. In both of the prior art breading machines as shown in FIGS. 1 and 2 the battered product which is disposed on the conveyor 12 on a layer of breading material disposed on conveyor section 31 and subsequently supplied with breading on their upper surface at the location of opening 35 in hopper section B. The coated food products will then exit from the breading machine and subsequently by packaged for distribution to the consumer.

Figure 3:
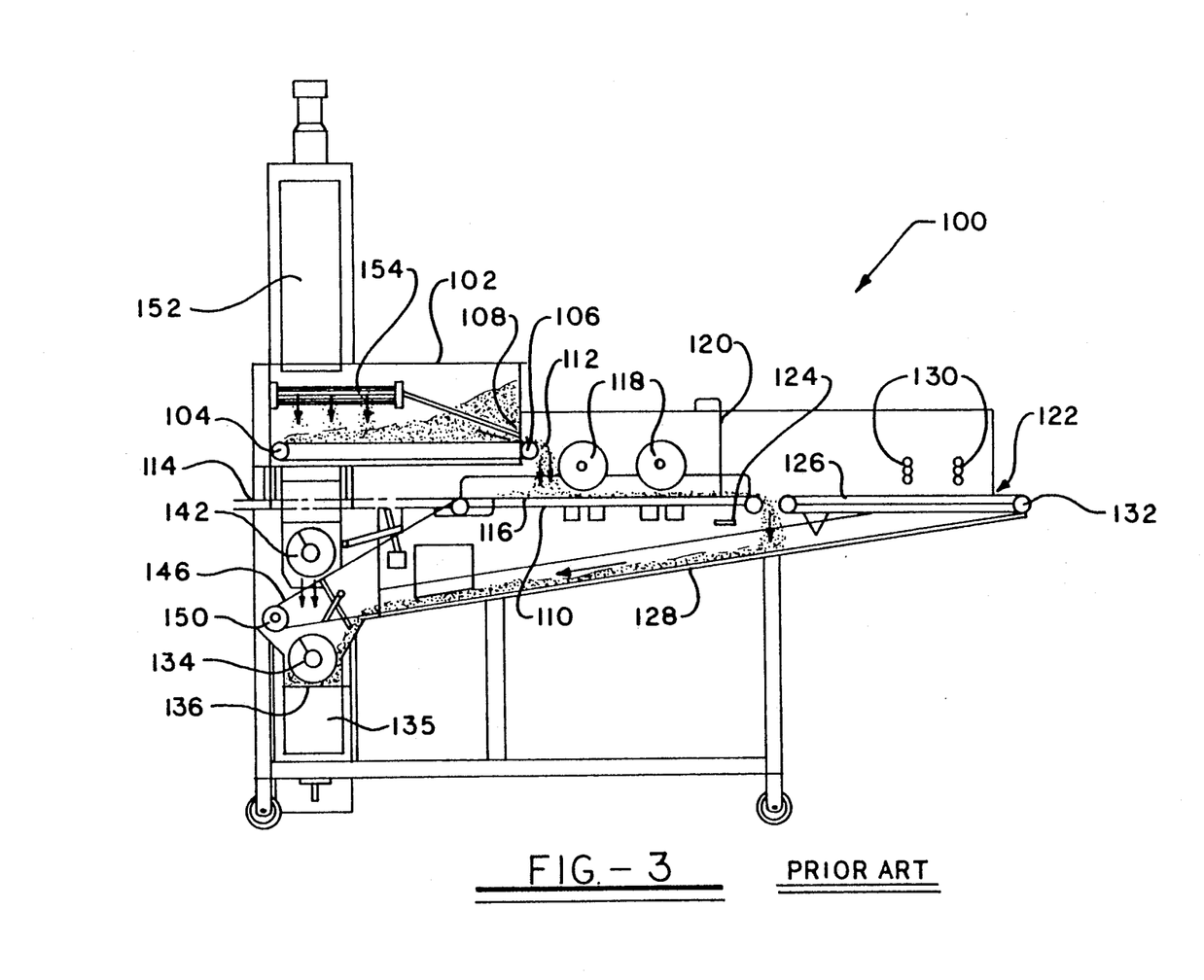
FIG. 3 is a side vertical sectional view in schematic form of the prior art breading machine as in FIG. 1 showing the components and operation thereof in more detail.
Figure 4:
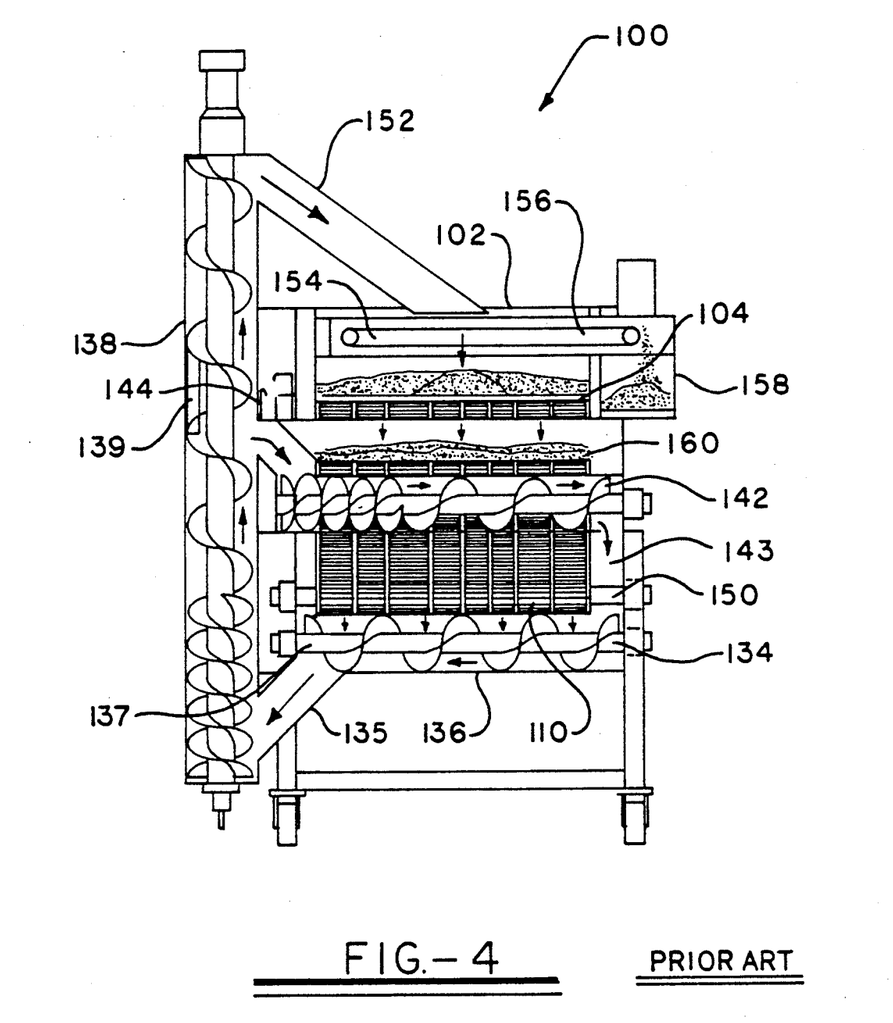
FIG. 4 is a front vertical sectional view in schematic form of the breading machine as shown in FIG. 3.

The breading recirculation system of the prior art breading machines as shown in FIGS. 1 and 2 is more distinctly seen with reference to FIGS. 3 and 4 which show the recirculation system for a breading machine as in FIG. 1 for flour type breading which also has been used for Japanese style breading crumbs in a machine as in FIG. 2.

Turning now to FIG. 3, the breading machine generally indicated by 100 includes hopper 102 having an amount of breading material disposed therein. The hopper 102 may contain a conveying system 104 including a hopper drive shaft 106 at the hopper gate area 108. By this structure, an amount of flour or breading material is continuously conveyed to the hopper gate 108 which may be adjusted to let a desired amount of the flour be withdrawn from hopper 102 and disposed on the upper surface of a product belt 110 at 112. An in feed conveyor 114 or batter machine conveys either battered or unbattered product 116 into the breading machine for coating thereof. The conveyor belt 110 is provided with a layer of the breading material thereon as will be hereinafter described such that bottom layer of the product 116 will be coated. The breading material from hopper 102 falling therefrom at 112 will be disposed on the upper surface of the product 116 to fully coat the product with the breading material as previously described.

The coated product 116 will then be conveyed to pressure rolls 118 to help retain the coating on the product 116. A dust curtain 120 is provided to retain any airborne flour in the machine and to help settling thereof. After passing through the pressure rolls 118, the coated product 116 is further conveyed on belt 110 towards the exit of the machine at 122. Belt vibrators 124 are provided to shake the belt 110 at this location so as to loosen any of the flour or breading material which is not firmly disposed on the product 116. Any extraneous flour is then made to fall from the surface on which the product 116 is conveyed to the lower sloping surface 128 of the breading machine. A separate conveyor 126 continues to transport the product 116 towards the exit 122 wherein flower tubes 130 are provided to blow off any excess breading material from the products before exiting at 122. The continuous wire mesh belt forming the conveyor system is then made to wrap around idler roller 132 so as to run down and drag along the bottom sloping surface 128 of the machine. In this way, the belt acts to convey the extraneous flour or breading material down the sloping surface 128 and towards a cross feed screw 134 situated in cross feed housing 136 in which the breading material will fall into. The cross feed screw 134 will convey they extraneous breading material to a vertical screw 138 which will convey the extraneous flour or breading material upwardly as seen in FIG. 4. It is noted that the vertical screw 138 includes double flighting of the auger blades at the lower end thereof to facilitate movement of the flour or breading material out of this zone as fast as possible.

During the upward movement of the breading material with the vertical screw 138, a discharge chute 140 is provided such that a portion of the breading material will be discharged from the vertical screw into the chute 140 and to a spreader screw 142. A gate 144 is positioned over the discharge chute 140 such that a selected amount of breading material will be discharged into the chute 140 and to the spreader screw 142. The spreader screw 142 will convey the breading material horizontally and a portion of the breading material will fall from an aperture formed in the spreader screw housing to form a layer of breading material across the width of the conveyor belt 110 at 146. It is in this manner that the bottom layer of breading material is formed on the product belt before the product 116 is disposed thereon such that the bottom surface of the product 16 may be fully coated with the breading material as desired.

Any excess breading material remaining with the spreader screw 142 is discharged from the spreader screw housing through a relief hole 148 back to the cross feed screw 134 so as to be recirculated in the system. A paddle 139 may be positioned on the vertical screw 138 so as to ensure the proper amount of breading material is discharged into chute 140 to supply the spreader screw 142 with a sufficient amount of breading material to form the base layer of breading belt 110. It is also noted that the spreader screw 142 has double flighted auger blades at the location of chute 140 so as to more quickly move the breading material in this area and obtain uniform spreading thereof on the conveyor belt 110. It is also noted that the conveyor 110 is driven by a main drive shaft at 150 by a motor (not shown) which is in turn coupled to the cross feed screw 134 to provide rotation thereof and proper recirculation of the breading material.

In another aspect of the prior art breading machine, the relief hole 148 in the spreader screw housing is a somewhat narrow opening through which the breading material will fall and is normally provided with protective rods as a safety feature to inhibit access to the cross feed screw 134 or spreader screw 142 with the hand or the like of an operator which may cause injury. With this structure it was found that the protective rods inhibited the flow of flour or breading material and the breading material tended to bridge in this area preventing free flow and proper recirculation of the material It is also noted that in the area of chute 135 as shown at 137, the breading material had the tendency to bridge at the cross feed screw 134 thereby preventing proper recirculation of the breading material Any bridging or congestion necessitates stopping production so as to enable cleaning of these areas before operation of the machine can be continued.

After an amount of breading material is supplied through chute 140 to the spreader screw 142 the remaining amount of breading material is conveyed upwardly by the vertical screw 138 to be disposed into discharge chute 152 which disposes the breading material back into the hopper 102 onto sifter assembly 154. The sifter assembly 154 also includes sifter belt vibration means at 156 as well as a sifter crumb box 158 to provide uniform distribution of the recirculated breading material in the hopper 102. As previously described, the breading material from hopper 102 is disposed onto the upper surface of the product conveyor belt so as to coat the upper surface of products disposed thereon as shown at 160. As mentioned previously, the recirculation system as shown in FIGS. 3 and 4 is also usable with Japanese style crumbs including the modified hopper arrangement with which the Japanese style crumbs are distributed as shown in FIG. 2.

The problems associated with the apparatus as shown in FIGS. 3 and 4 lie in the tendency of the breading to build up and bridge across openings such as the chutes 135 and 140 as well as the relief hole 148 between the spreader screw 142 and cross feed screw 134. When using Japanese style crumbs, the bridging or build up in these areas tends to adversely affect the condition of the crumbs which are more fragile and require more delicate handling. It is also noted that the food processor must stop the operation of the machine to accomplish cleaning of these areas thereby inhibiting the effective use of the machine in continuous operation for supplying large amounts of breaded food products.

Another disadvantage of the prior art apparatus is found in that the cross feed screw 134 is coupled to the main drive shaft of the product belt such that it may only be rotated in accordance with the speed of the belt and not according to the particular breading material being utilized in the machine. For example, when using a flour breading material it is desirable to rotate the cross feed screw 134 at a faster pace to try and prevent bridging of the material at the location 137 and discharge chute 135 as previously described. Flour breading material itself can have different physical characteristics requiring different speeds of the cross feed screw 134 which was not enabled with the prior art apparatus. Similarly, with Japanese style crumbs, it is desirable to rotate the cross feed screw 134 at a slower pace to obtain better results without degrading the physical characteristics of the crumbs during operation of the machine.

Figure 5:
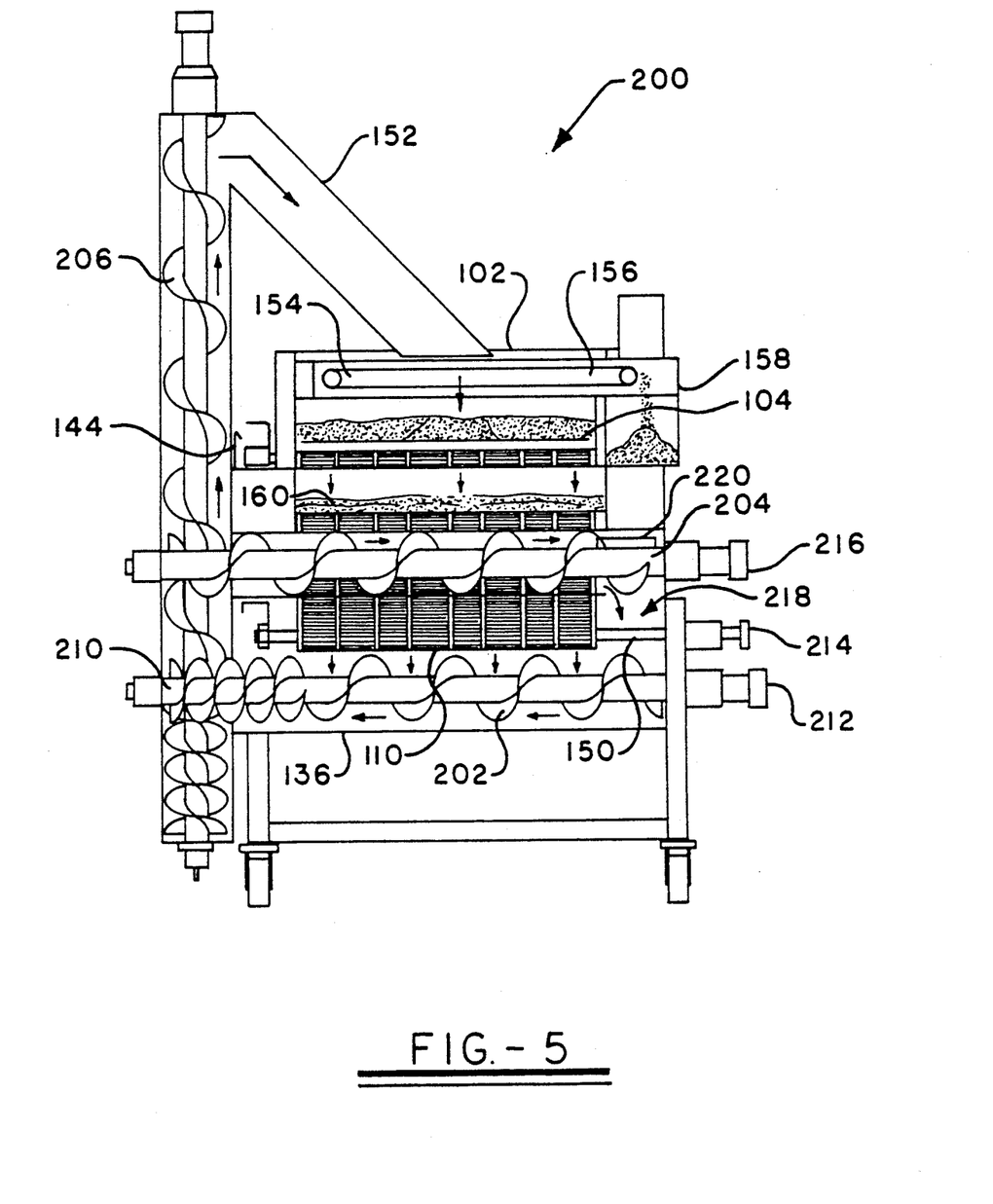
FIG. 5 is a front vertical sectional view in schematic form of the breading machine of the present invention.
Figure 6:
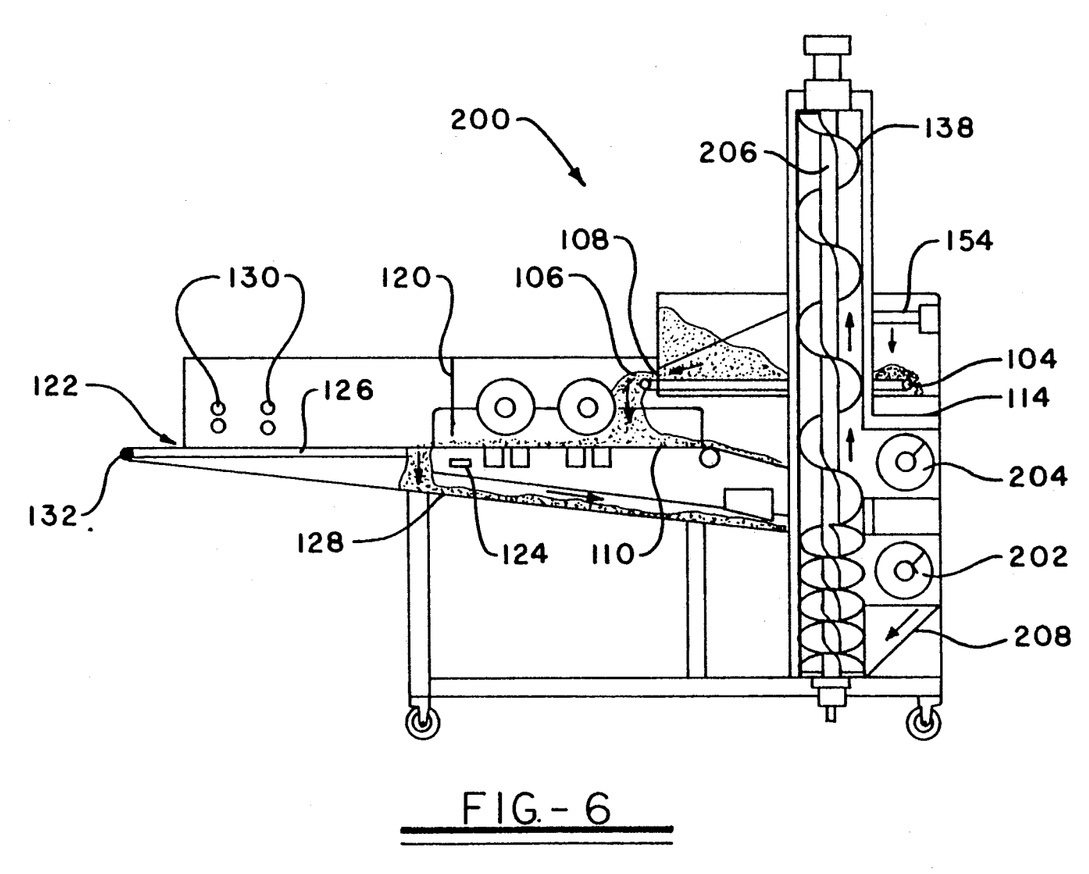
FIG. 6 is a side vertical sectional view in schematic form of the breading machine as shown in FIG. 5.

Turning now to FIGS. 5-9, the improved breading machine apparatus will be described in more detail. It is noted that much of the same structure is utilized in the construction of the apparatus of the present invention, being indicated with similar reference numerals to that previously described In order to avoid the problems in the recirculation system of the breading machine as previously described, the present invention relieves any congestion or bridging of the breading material by providing direct auger-to-auger transfer of the breading material As seen in FIGS. 5 and 6, both the cross feed screw 202 and the spreader screw 204 extend across substantially the entire width of the breading machine to a position directly adjacent the vertical screw 206 which is placed in an offset position behind and adjacent the extending horizontal screws. In this way, the cross feed screw 202 will convey breading material directly to a position side by side with the vertical screw such that any congestion or build up of the breading material will be augered away by the vertical screw 206. This arrangement is especially suitable for flour-type breading material as the auger-to-auger action will not adversely affect the physical characteristics of these materials.

In another aspect of the invention, the recirculation system is also usable with Japanese style crumbs by the provision of a discharge chute 208 coupling the housing of the cross feed screw 202 with the housing of the vertical screw 206. The discharge chute 208 is in-line with the vertical screw 206 and perpendicular to the cross feed screw 202 and provides an outlet for the breading material from the cross feed screw 202. It has been recognized that the direct auger-to-auger coupling of the cross feed screw 202 with the vertical screw 206 may adversely effect the Japanese style crumbs and the provision of the sloping discharge chute 208 provides a release through which the Japanese style crumbs will be discharged due to their larger particle size and flowability. In this way, the Japanese style crumbs will be more gently handled with the same recirculation system to retain their desirable physical characteristics. Other breading materials will also be more easily removed from the cross feed screw 202 to facilitate the prevention of bridging and congestion. Thus, the breading machine as shown in FIGS. 5 and 6 may easily be converted to a Japanese style crumb breading machine by utilization of the different hopper arrangement as previously described and will work effectively with either arrangement.

It is also noted in FIG. 5 that the cross feed screw 202 is provided with double flighted auger blades at location 210 or in proximity of the vertical screw 206 so as to move the breading material more quickly in this region to further prevent any chance of bridging or congestion of the material as desired. It is also desirable to operate the cross feed screw 202 at varying speeds depending upon the particular breading material being utilized in the machine so as to optimize the operating characteristics of the machine. The cross feed screw 202 is therefore provided with its own drive motor at 212 which may be selectively controlled to vary the speed of the cross feed screw 202. Similarly, the main drive shaft 150 of the product belt 110 and the spreader screw 204 are each provided with their own separate drive motors 214 and 216 respectively to selectively vary the speed of the conveyor and the amount of breading material provided for the base coating respectively as desired. It is also noted that the discharge chute 208 associated with the cross feed screw 202 is designed as steeply as possible within manufacturing limitations to ensure proper transfer of the breading material from the cross feed screw 202 to the vertical screw 206 and is preferably at an angle in the range from 30 to 60 degrees angling towards the vertical screw 206.

Similar to the construction previously described, the vertical screw 206 will convey the breading material upwardly until it reaches the location of spreader screw 204 which again is in direct auger-to-auger contact with the vertical screw 206 to avoid congestion and bridging of the breading material at this location. Thus, no discharge chute is provided between the vertical screw 206 and spreader screw 204 thereby reducing any chance of bridging of the breading material at this junction. It should also be recognized that the direct auger-to-auger coupling will act to mechanically remove any bridging or congestion as previously described. By forming the direct auger-to-auger coupling between the vertical screw 206 and spreader screw 204, the spreader screw 204 is not required to have double flighted auger blades at this location to help reduce the bridging problem.

At the far end of the spreader screw 204, any breading material which remains in the spreader screw housing will be dumped back down to the cross feed screw 202 to thereby recirculate this material in this system. In the prior art apparatus, the relief hole utilized for this purpose was a spot at which the breading material congested and bridged due to the use of protective rods covering the relief hole and the narrowness of the opening. In the present invention, the entire width of the breading machine 200 has been extended to allow for a larger relief hole 218 through which the excess breading material from the spreader screw 204 will be dumped to the cross feed screw 202. The protective rods of the prior art have also been eliminated such that nothing will inhibit the flow of the breading material through the relief hole 218 to facilitate proper recirculation and prevention of congestion in this area. The relief hole 218 has been designed to be more than double the width of the prior art relief hole and more assuredly removes breading material from the spreader screw 204 to the cross feed screw 202. To further enhance this function, a paddle 220 may be provided in association with the spreader screw 204 so as to continuously sweep through this area and facilitate removal of the breading material from the vicinity of the spreader screw 204 through the relief hole 218. The removal of the protective rods from the area of the relief hole 218 removes any structure which would retard the flow of the breading material through the relief hole but does present the problem of protecting the user from the action of the screws which may present a safety hazard. For this reason, the sides of the relief hole 218 have been enclosed to prevent access into the vicinity of the screws 202 and 204 in this area as desired.

Figure 7:
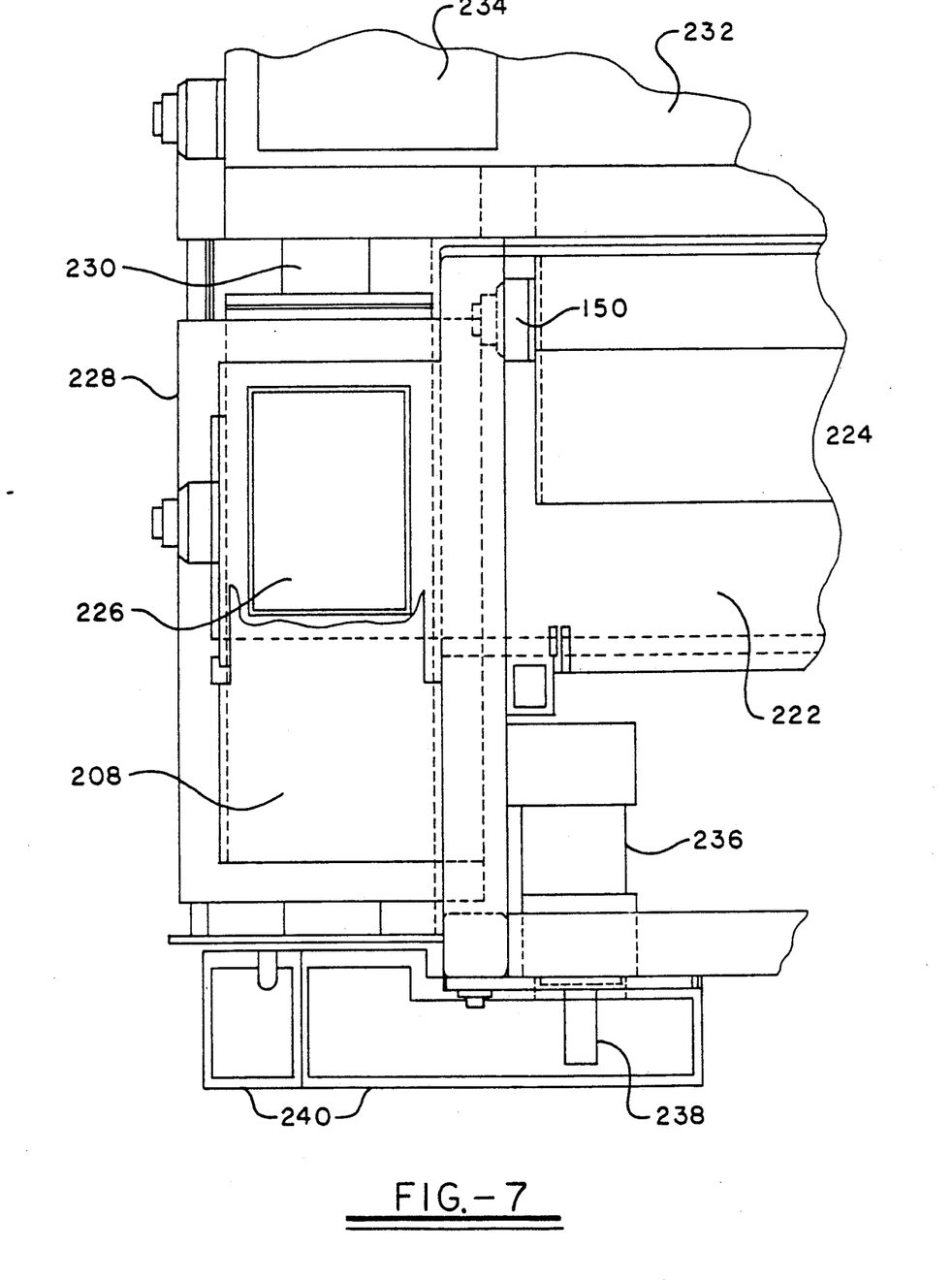
FIG. 7 is an enlarged partially cut-away frontal view of the recirculation transition zone of the breading machine as shown in FIG. 5.
Figure 8:
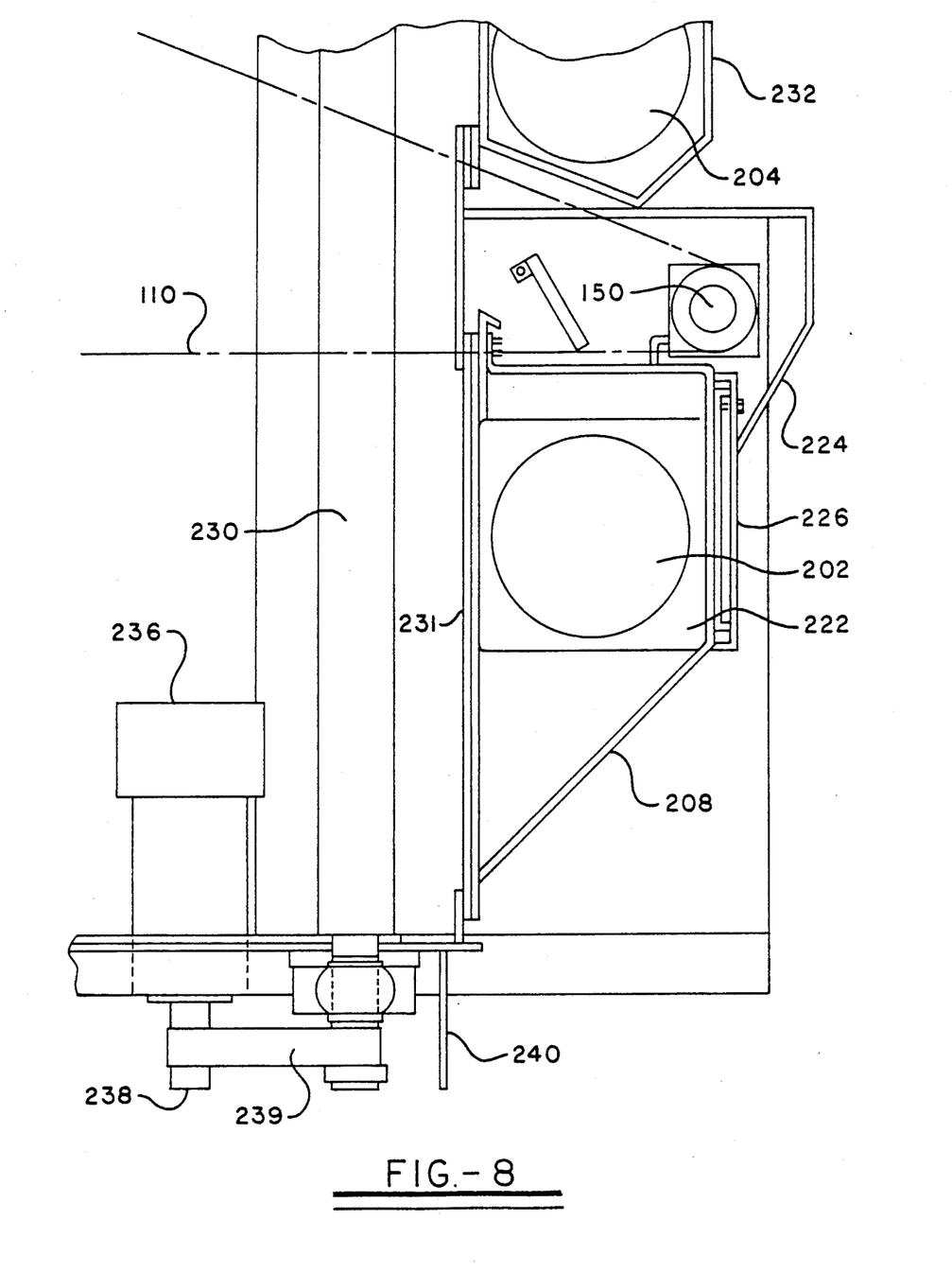
FIG. 8 is an enlarged partially cut-away side elevational view of the recirculation means of the invention as shown in FIG. 7.
Figure 9:
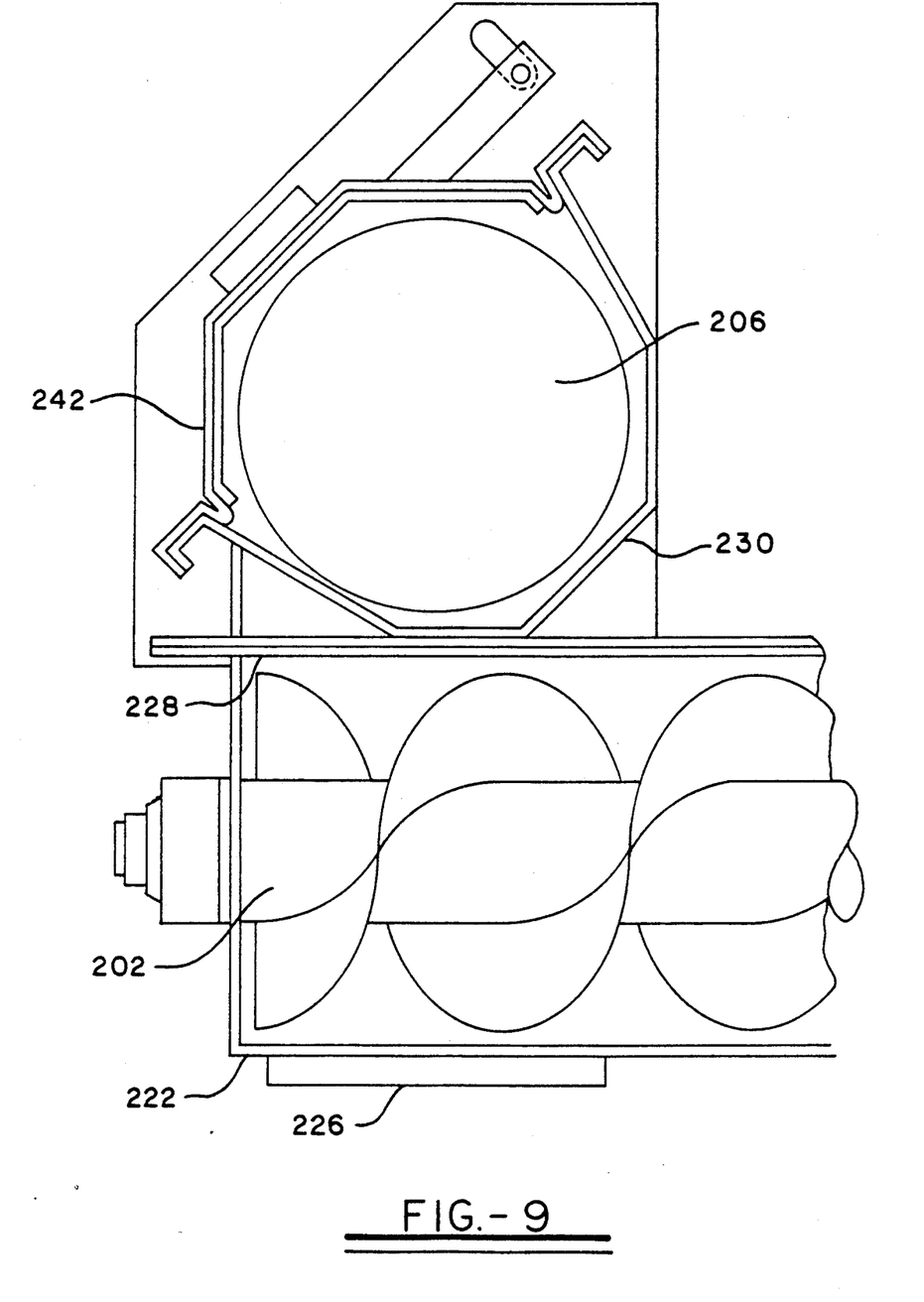
FIG. 9 is an enlarged partially cut-away top sectional view of the recirculation means of the invention as shown in FIG. 7.

Turning now to FIGS. 7-9, the junction between cross feed screw 202 and vertical screw 206 is shown in more detail as seen from the outside thereof. It is another advantage of the present invention that although congestion and bridging of the breading material is prevented to a greater extent, the machine is provided with additional access doors to facilitate proper cleaning and maintenance of the machine.

The areas of the horizontal and vertical screws of the recirculation system of the breading machine 200 are thus provided with access doors to facilitate proper cleaning of the inner chambers and surfaces of the breading machine for alternating the type of breading material to be used or simply maintaining a superior degree of cleanliness when working with food products. The cross feed screw housing 222 has a main access door 224 extending at least the width of the product belt and acts to cover the major portion of the cross feed screw as well as the edge of the product belt along the main drive shaft 150 thereof. In the transition zone between the cross feed screw 202 and the vertical screw 206, another access door 226 is provided to enable viewing the transition zone at discharge chute 208 for checking the flow of breading material in this region and for cleaning purposes.

The coupling between the cross feed screw 202 and vertical screw 206 comprises a supporting plate 228 forming the transition zone cross feed screw housing as well as the discharge chute 208. The plate 228 may be firmly secured to the vertical screw housing 230 along its edges. The vertical screw housing 230 is provided with an aperture 231 to enable direct coupling between the cross feed screw housing 222 and discharge chute 208 to provide the direct auger-to-auger coupling and access from the discharge chute 208 to the vertical screw. The spreader screw housing 232 is also provided with a main access door (not shown) which extends over at least the width of the product belt. A transition zone access door 234 is provided at the location relative to the vertical screw housing 230 which again has an aperture communicating with spreader screw housing 232 for direct auger-to-auger coupling. The vertical screw in housing 230 is rotated by means of motor 236 having a drive shaft 238 extending therefrom to which may be applied a drive belt or chain 239 coupled to a drive shaft of the vertical screw. Safety guards 240 may be provided to protect the drive mechanism as desired. Alternatively, a hydraulic motor may be mounted on the top of the vertical screw 206 or a direct drive with a flexible coupling at it's bottom may be used to drive this screw at a selected speed.

As seen in FIG. 9, the vertical screw housing 230 also comprises an access door 242 which extends substantially the entire height of the vertical screw 206. With the structure as described, it should thus be seen that the recirculation system is completely accessible for cleaning and maintenance as desired.

It should thus be seen that the breading machine of the present invention provides a breading recirculation system which prevents the bridging or congestion of the breading material which may present a problem to efficient operation of the machine. The recirculation system will operate equally well with either flour, free flowing or Japanese style breading materials. The operation of the recirculation system is selectively variable to accommodate different breading materials and to optimize the operation with different materials. The breading machine is also provided with means to easily access the interior thereof for cleaning or maintenance.

Although the present invention has been described with respect to specific embodiments thereof, it will be understood that various changes and modifications will be suggested to one skilled in the art and it is intended to encompass such changes or modifications as fall within the scope of the appended claims.

What is claimed is:

1. A breading machine for dispensing a coating material onto a work product, comprising,
    an enclosure defining a breading chamber, and means to convey work products through said breading chamber,
    a breading hopper adapted to dispense a coating material on said work product within said breading chamber,
    a first generally horizontal screw positioned in a first housing adapted to accept excess coating material from said breading chamber,
    a second generally vertical screw positioned in a second housing adapted to supply breading material to said breading hopper,
    said first screw acting to convey said excess breading material to said second screw which acts to convey said excess breading material to said breading hopper, wherein said first screw is positioned in overlapping directly adjacent relationship to said second screw such that said first and second screws are in auger-to-auger contact for direct transfer of said breading material therebetween.

2. The breading machine as defined in claim 1, wherein,
    said means to convey is an endless product conveyor belt having an upper belt run on which said work products are carried and a bottom return belt run, and wherein
    said breading chamber includes a sloping bottom surface on which said excess breading material will fall and be conveyed to said first housing by said bottom return belt run along said sloping bottom surface of said breading machine.

3. The breading machine defined in claim 1, wherein,
    said first housing is coupled to said second housing by coacting apertures formed in said first and second housings.

4. The breading machine as defined in claim 1, wherein,
    said first housing having a discharge chute formed therein in an in-line relationship with said second screw to supply said breading material to said second screw wherein said discharge chute will enable breading material having larger sized particles and increased flowability to be discharged from said first screw to said second screw without adversely affecting the physical characteristics of said breading material.

5. The breading machine as defined in claim 1, wherein,
    said first and second screw are provided with double flighted auger blades at least adjacent the transition zone therebetween so as to convey said breading material more quickly in said transition zone.

6. The breading machine as defined in claim 1, wherein,
    said first and second screws are provided with independent and separate motor means utilized to rotate said screws at selectively variable speeds to accommodate different breading materials.

7. A breading machine as defined in claim 1, further comprising
    a third generally horizontal screw positioned in a third housing to supply an amount of said breading material to a product conveying means thereby forming a layer of said breading material on said product conveying means before said work product is placed thereon,
    said third screw being positioned directly adjacent said second screw such that said second and third screws are in auger-to-auger contact for direct transfer of said breading material therebetween.

8. The breading machine as defined in claim 7, wherein
    said third housing is coupled to said first housing by a discharge hole whereby any excess of said breading material will be discharged from said third housing through said discharge hole and wherein said discharge hole has nothing which impedes the flow of said breading material therethrough.

9. The breading machine as defined in claim 8, wherein
    said third screw is provided with a paddle thereon positioned in the vicinity of said discharge hole so as to continuously sweep through the area of said discharge hole and to facilitate transfer of said excess breading material through said discharge hole.

10. In a breading machine having a conveyor means with an upper conveyor run for moving a plurality of work products to be coated with breading material along a breading or coating path within a breading chamber and hopper means enabling discharging of breading material at a zone along aid path, wherein
    said hopper means is provided with breading material from a breading recirculation system having a first generally vertical screw coupled with said hopper means which is operable to discharge said breading material into said hopper means from a position below said hopper mean such that said hopper means will be operable to discharge breading onto said conveyor means to form at least an upper coating on said product wherein any excess of said breading material discharged onto said conveyor means will be returned within said breading chamber to a second generally horizontal screw for conveying said excess breading material back to said first screw thereby recirculating said excess breading material within said breading machine, wherein
    said second screw is positioned directly adjacent said first screw such that said first and second screws are in auger-to-auger contact for direct transfer of said breading material therebetween.

11. In the breading machine as defined in claim 10, wherein,
    said breading chamber includes a sloping bottom surface on which said excess breading material will fall and said conveyor means includes a bottom conveyor run which is adapted to convey said excess breading material to said first housing.

12. In the breading machine as defined in claim 10, wherein,
    said second screw is positioned in a housing having a discharge chute formed therein in an in-line relationship with said first screw to supply said breading material to said first screw wherein said discharge chute will enable breading material having larger sized particles and increased flowability to be discharged from said second screw to said first screw without adversely affecting the physical characterisitcs of said breading material.

13. In a breading machine as defined in claim 10, wherein,
said first and second screw are provided with double flighted auger blades at least adjacent the transition zone therebetween so as to convey said breading material more quicly in said transition zone.

14. In a breading machine as defined in claim 10, wherein,
said first and second screws are provided with independent and separate motor means utilized to rotate said screws at selectively variable speeds to accommodate different breading materials.

15. In a breading machine as defined in claim 10, further comprising
a third generally horizontal screw used to supply an amount of said breading material to said conveying means thereby forming a layer of said breading material on said conveying means before said product is placed thereon,
said third screw being positioned directly adjacent said first screw such that said first and third screws are in auger-to-auger contact for direct transfer of said breading material therebetween.

16. In the breading machine as defined in claim 15, wherein
said third screw is positioned in a housing which is coupled by a discharge hole to said second screw whereby any excess of said breading material will be discharged from said third screw through said discharge hole and wherein said discharge hole has nothing which impedes the flow of said breading material therethrough.

17. The recirculation system as defined in claim 16, wherein,
said third screw is provided with a paddle thereon positioned in the vicinity of said discharge hole so as to continuously sweep through the area of said discharge hole and to facilitate transfer of said excess breading material through said discharge hole.

* * * * *